United States Patent

[11] 3,530,922

| [72] | Inventor | Arthur C. Mathews<br>15 Cordova Court, Portola Valley,<br>California 94025 |
|---|---|---|
| [21] | Appl. No. | 726,461 |
| [22] | Filed | May 3, 1968 |
| [45] | Patented | Sept. 29, 1970 |

[54] ANTI-SKID TRACTION DEVICE
5 Claims, 6 Drawing Figs.

[52] U.S. Cl. .................................................. 152/225,
152/218
[51] Int. Cl. ................................................... B60c 27/04
[50] Field of Search ........................................ 152/213,
217, 218, 219, 225—230, 233

[56] References Cited
UNITED STATES PATENTS

| 2,528,165 | 10/1950 | Nickerson ................. | 152/230X |
| 2,808,868 | 10/1957 | Bryan ....................... | 152/228 |
| 3,031,000 | 4/1962 | Sebena ...................... | 152/218 |
| 3,089,529 | 5/1963 | Aler .......................... | 152/218X |

*Primary Examiner*—Arthur L. La Point
*Attorney*—Boyken, Mohler, Foster and Schwab ABSTRACT: An anti-skid traction device providing tread-engaging elements adapted to extend transversely across and against the tread of the pneumatic tire of a wheel and to be removably held in position without securement to the wheel, but by tensioning means connected with said elements operative for urging the tread-engaging elements into tight engagement with said tread when said tensioning means is tensioned, and for releasing said elements for removal when the tension is released, the application and removal of said elements being effected from the outer side of the wheel.

Patented Sept. 29, 1970
3,530,922
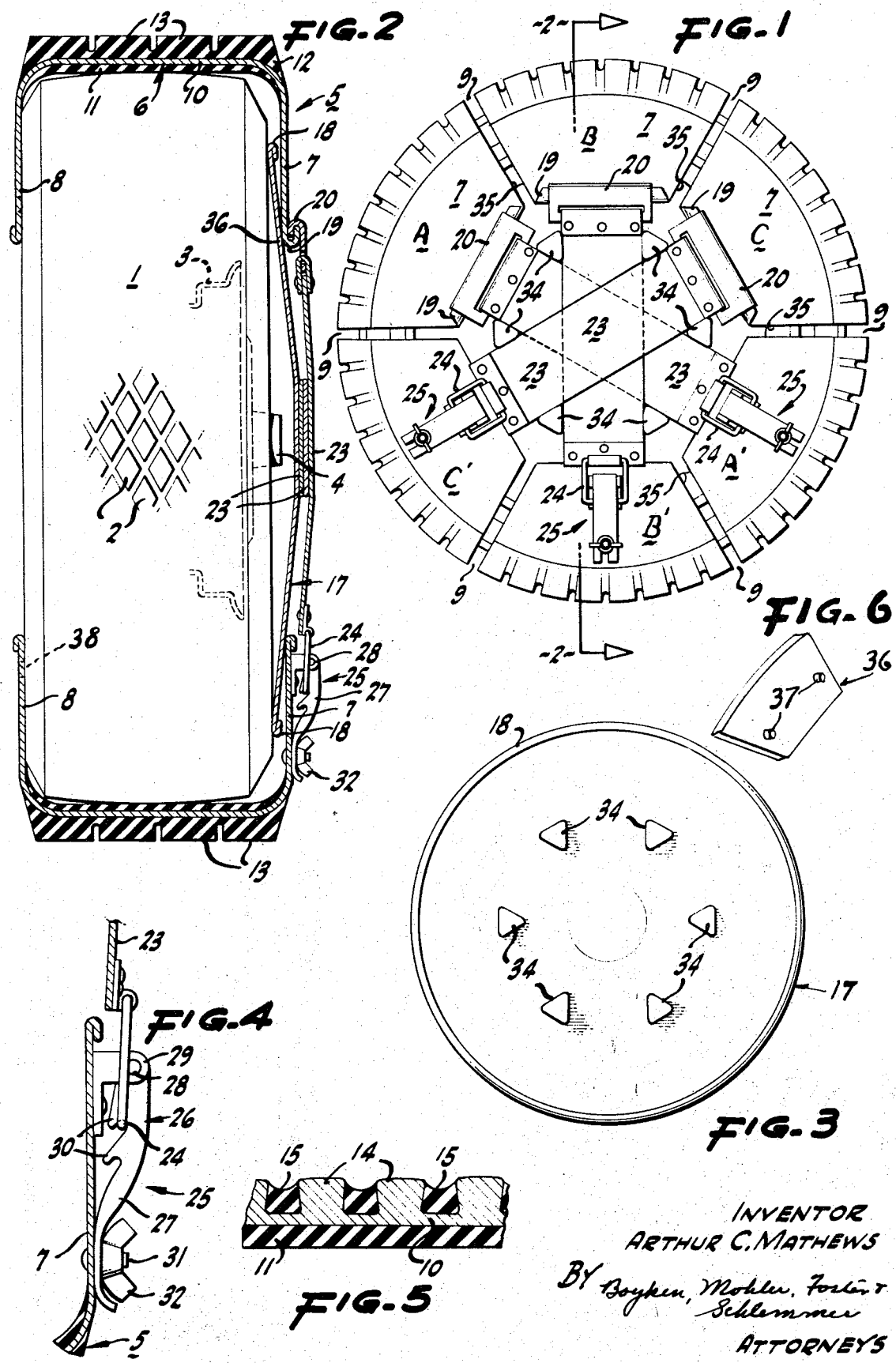
INVENTOR
ARTHUR C. MATHEWS
BY Boyken, Mohler, Foster &
Schlemmer
ATTORNEYS 3,530,922

ANTI-SKID TRACTION DEVICE

BACKGROUND OF INVENTION

Heretofore anti-skid traction devices for application to the pneumatic tires of vehicle wheels have usually required bolting or otherwise securing the devices to the wheels, it being understood that the word "secured" as used herein, means mechanically connected by means tying or uniting the device to the wheel, as distinguished from structure in the device itself and separate from the wheel that is operative for holding the device onto the wheel or tire by a clamping force. The wheel, in the present instance, has no additions or changes from a standard automobile wheel, other than the possible removal of the ornamental hub cap where the latter may project axially outwardly of the plane of the lateral outer surface of the tire a substantial distance. Such hub caps are not considered an essential part of a wheel.

SUMMARY

The anti-skid traction device of this invention comprises ground engaging anti-skid means that includes tread engaging elements adapted to be supported in an operative tread-engaging position on the pneumatic tire of a vehicle wheel. In said position the tread-engaging elements extend horizontally across said tread, and they have extensions on their ends rigid therewith extending radially inwardly relative to the axis of the tire supporting them, at opposite sides of such tire. The wheel and tire thereon have inner and an outer lateral sides, with the outer side facing outwardly of the vehicle on which the wheel is mounted, and the extensions preferably terminate at their inner ends at approximately the rim that secures the tire on the wheel.

Tension means connects only the extensions that are at the outer side of the wheel for releasably and yieldably holding the tread-engaging elements tightly against the tread of the wheel, and means is disposed between the wheel and the extensions of said tread-engaging elements that extend over the outer sides of the tire to prevent canting of the tread-engaging means. Upon releasing the tension means, and which means is unattached to the wheel, which includes the tire, the anti-traction device is free from the wheel for removal therefrom, there being no bolts, clips, or other means mechanically connecting and securing the anti-traction device to the wheel.

BRIEF DESCRIPTION OF THE DRAWINGS

In the drawings, FIG. 1 is a side-elevational view of an automobile wheel as seen from the side of the wheel that faces laterally outwardly of the vehicle.

FIG. 2 is an enlarged, cross-sectional view taken along line 2–2 of FIG. 1, the tire being shown in elevation with only a portion of a repetitive tread design being indicated.

FIG. 3 is a side-elevational view of an element shown in FIG. 1 and as seen from the same side, but separate from the latter, to show its structure.

FIG. 4 is an enlarged, fragmentary side-elevational view of one of the tensioning means of the device.

FIG. 5 is a fragmentary, cross-sectional view of a tread-engaging portion of the anti-skid friction device in a modified form.

FIG. 6 is a reduced size view of a spacer for narrower tires.

DETAILED DESCRIPTION

The pneumatic tire, generally designated 1, has a ground-engaging tread portion 2 that may have any of the conventional tread designs. This tire is mounted in the usual manner on a conventional rim 3 (FIG. 2) that, in turn, is part of the wheel generally designated 4 and which wheel is secured to the driven axles and rotatable on the others. This mounting of the wheel on the axle is conventional and a portion only of the rim and wheel and axle are indicated in broken lines in FIG. 2.

The anti-skid ground and tread-engaging elements are generally of U-shape, and are generally designated 5, the closed end 6 (FIG. 2) of each being adapted to extend horizontally and transversely across the tread 2 of the tire 1, and which closed end of each element is the portion that engages the ground and the tread of the tire. Extensions 7, 8, integral with each portion 6, extend angularly thereto and over the outer and inner lateral sides of the tire respectively, the "outer" side of said tire being the side that faces outwardly of the vehicle when the wheel is on the latter, and the "inner" side of the tire being the side opposite the outer side.

Each tread-engaging element 5 preferably comprises a segment substantially corresponding to the curvature of the tread circumferentially of the tire. Six tread-engaging elements are shown in the drawings, said elements being equally spaced apart a relatively small distance 9 (FIG. 1) thereby substantially avoiding undesirable road noise and vibration during running of the wheel on the highway. It is, of course, to be understood that the invention is not necessarily limited to six segments.

The segment of each tread-engaging element comprises a relatively rigid core or central portion 10 that may be of metal, and the extensions 7, 8 are rigid and integral therewith and a rubber or rubber-like material encloses said portion 10 and is bonded thereto. The inside layer 11 of said rubber or rubber-like material is preferably relatively soft so as to be slightly indented by the tread design of tread 2 when said layer 11 is tightly drawn against the tread 2, thereby resisting slippage between the tread 2 and the tread-engaging element. The outer layer 12, that is adapted to engage the highway is preferably substantially harder than the layer 11, being resistant to wear on the highway, and projections 13 may be integral therewith, or, in the modified form in FIG. 5, projections 14 may be integral with the metal central portion 10 and of a design similar to the design of the tire tread, so as to project through layer 15 and outwardly of the latter to engage the highway (FIG. 5) or ice on the latter. In this form, layer 15 is generally comparable to layer 12 except for projections 9, and layer 15 is depressed below the outer surfaces of said projection so as to insure gripping engagement between projections 14 and the ice, snow or the surface of the highway. In some instances the layer 15 may be omitted.

Layers 11, 12 of each segment may enclose the functions between portion 10 and extensions 7, 8, while the latter may be exposed to lighten the weight and for compactness and economy of manufacture, although said extensions may be covered with a relatively thin layer of rubber-like material if desired.

The opposite lateral edges of each extension 7, 8 may extend generally radially inwardly from the ends of each segment 10 with the adjacent edges of adjacent pairs of said segments being spaced apart, and each extension 7, 8 preferably extends over the side wall of the tire that is adjacent thereto (FIGS. 1, 2).

A circular disc-like plate generally designated 17 (FIG. 3) is adapted to be positioned at its outer edges against the outer side of tire 1 (FIG. 1), and coaxial with said tire.

The outer marginal portion of plate 17 is positioned between the extensions 7 and the side wall of the tire that is adjacent thereto. The outer edge 18 of the plate 17 is adapted to engage the lateral outer surface of said side wall, and which edge is rounded in cross sectional contour so as not to scuff or injure said outer surface.

The tread-engaging elements 5 are an even number so that pairs thereof are at diametrically opposite points around tire 1 when the anti-skid device is in operative position on a tire, and one-half of the extensions 7 that extend over one-half of the tire are formed at their radially inner ends to provide hooks 19 (FIG. 2). Each hook 19 is adapted to be releasably engaged by a similar hook 20 on one of the ends of elastic members or straps 23 (FIGS. 1, 2) by rivets or by any other suitable means, the portions of said straps that are riveted to said hooks 20 being preferably reinforced by fabric therein, vulcanized or bonded thereto, or in any other suitable manner, so as to be inelastic where attached to hooks 20. The members or straps 23 comprise tension means for holding the tread-engaging elements tightly against the tread of the tire, as will be explained.

The end of each elastic member 23 that is opposite to the end having hook 20 is provided with one element 24 of any suitable tensioning means, generally designated 25, which tensioning means is shown in the drawings as a coupling, and said one element comprises a wire loop pivotally supported on said one end of strap 23. The other element of each coupling and tensioning means 25 is generally designated 26 and is secured to one of the ends of the extensions 7 that do not carry hooks 19.

Each such other element 26 comprises an arm 27 pivotally mounted by a pivot 28 (FIG. 4) between a pair of ears 29 secured on the end portion of each extension 7 that is opposite to one of the extensions having a hook 19 thereon. Said arm 27 is elongated and has a number of hook-like teeth 30 spaced longitudinally thereof and projecting to the underside thereof that is adapted to face the extension 6 when the arm is swung to a position over said extension and extending away from the end of member 23 that is adjacent thereto. Thus the coupling may be effective for different tires.

In operation, when the arm 27 is swung to a position projecting outwardly of extension 7 with which it is connected, the loop 24 may be slipped over the arm to be engaged by one of the teeth 30, and when the outer end of said arm is then swung downwardly to a position adjacent to said extension 7 the strap 23 carrying the loop 24 will be tightened to tightly draw the portions 6 of tread-engaging elements 5, at opposite points around the tire, into tight engagement with the tread of the tire and to slightly stretch the members or straps 23 for yieldably holding the tread-engaging elements against the tread.

When the outer end of arm 27 is substantially against the extension 6 to tension the tensioning means or members 23, the outer end of the loop 24 that is in engagement with one of the hooks 30 will have moved past the maximum tension line coincidental with the strap 23 to automatically hold the arm in a locking position when the tensioning means is tensioned. To insure against accidental release of arm 27, a bolt 31 secured to each extension 7 may extend through the slotted outer end of said arm, and a wing nut 32 on said bolt will be tightened to releasably lock the arm against such release.

Referring to plate 17 (FIG. 3), said plate is molded or stamped to provide pairs of outward projections 34 that are adapted to project between the adjacent side edges of adjacent pairs of straps 23 (FIG. 1) when the anti-skid devices are on a tire. These projections 34 provide means for positioning the tread-engaging elements at equally spaced points around the tire, and to maintain said spacing. Said projections, being at opposite sides of each strap 23 at opposite sides of the axis of the tire, function to hold the plate 17 coaxial with the wheel, when all of the straps are in position, and permit sufficient radial movement of the tread-engaging elements for applying the latter to tires of varying outer diameters, inasmuch as space 35 is left between adjacent pairs of elements 7.

The spacing between extensions 7, 8 of each tread-engaging element is such that the tire 1 will readily be received between said extensions with the plate 17 disposed between the extensions 7 and the tire. Plate 17 is of substantially less diameter than the diameter of the outer periphery of the tire 1.

In FIG. 1, the elements designated A, B, C are the ones having the hooks 19, while the elements A', B', C' are those having coupling means 24 thereon. Elements A', B', C' are those respectively directly opposite elements A, B, and C.

In operation, commencing with the bare tire, the above elements may be applied on the tire as follows.

The element A is first positioned on the tire in the position occupied by element C' in FIG. 1 and the plate or disc 17 may then be positioned against the outer side of the tire, after which element A' is positioned over the tire in a position opposite to element A, or in the position occupied by element C in FIG. 1, and a strap 23 then connects the elements A, A'. The strap extends centrally across the outer side of the disc 17 between the pairs of projections 34 at opposite sides of the center of the wheel, thus holding the plate 17 coaxial with the wheel and against the side of the tire.

The element B is next positioned over the tire in the position occupied by element A in FIG. 1, and element B' is positioned on the tire opposite to element B and the elements B, B' are then connected by a strap 23.

After the foregoing is accomplished, the car may be moved forwardly so as to be supported on element B', after which elements A, A' and B, B' will be in the positions shown in FIG. 1.

The elements C, C' will lastly be positioned over the tire in the positions shown in FIG. 1 and connected by a strap 23.

The straps are tensioned when connected with the pairs of opposite elements, so the installation will be completed after elements C, C' are connected.

It is pertinent to note that the elements A, B, C, A', B' and C' are all positioned over the most easily accessible portions of the wheel; namely, the portions at the forward and rear points on the tire, which are more readily reached than a point directly over the tire.

FIG. 6 is a reduced size perspective view of a spacer 36 that may be used between extensions 8 for narrower tires than is shown. Normally spacers of only several thicknesses may be used to take care of all variations, each spacer being a plate generally corresponding in shape and size to each extension 8, and provided with a pair of projections 37 adapted to fit in corresponding openings 38 (FIG. 2) in each element 8 to prevent displacement of the spacers. The latter may be of any suitable material.

In the foregoing description it is seen that where the anti-skid device is to be used on different sized tires, the tread-engaging elements will be held in their positions relative to each other by the projection 34, and plate 17 will also be held coaxial with the wheel, and at the same time the elements 5 may be moved radially of the tire to different positions. Even where the dimension of the tire between extensions 7, 8 may vary, the engagement between the radial inner ends of said extensions 7 and plate 17 will prevent objectionable canting of the portion 6.

At the present time, the tires and wheels on vehicles are usually so constructed as to eliminate any substantial projection of the axles or hub caps outwardly of the vertical plane of the outer sides of the wheels, both to prevent injury to the hub caps from striking high curbs, and to minimize injury to persons that may otherwise be struck, hence the hub caps usually will not interfere with the application of the present invention, and excessively projecting hub caps may be quickly removed should there be any such interference.

It will be understood that various modifications of the invention, as described in detail, may occur to those skilled in the art, therefore, it is intended that no limitations be placed on the invention except as defined by the scope of the appended claims.

I claim:

1. An anti-skid traction device for application to and for removal from a wheel that includes a pneumatic tire having a ground-engaging tread and which wheel is mounted on an axle of a vehicle and has an outer side facing outwardly of said wheel and said vehicle, comprising:
   a. ground-engaging anti-skid means including tread-engaging elements adapted to be supported in an operative tread-engaging position extending horizontally across said tread;
   b. outer and inner extensions on said tread-engaging elements respectively extending radially inwardly from said tread-engaging elements relative to said axis at said outer side of said wheel and at the inner side of said wheel when said tread-engaging elements are in said operative tread-engaging position;
   c. tension means connected with said outer extensions extending radially inwardly therefrom adapted to be tensioned for yieldably holding said tread-engaging elements yieldably against said tread when said tension means is tensioned, and means for so tensioning said tension means;

d. extension engaging means unsecured to said wheel and said extensions disposed between said outer extensions and said wheel in frictional engagement with the outer side of said wheel, having axially outwardly facing free surfaces held in yieldable frictional engagement with said outer extensions by said tension means for holding said extension engaging means in yieldable engagement with said wheel when said tread-engaging elements are held in said operative tread-engaging position by said radially inwardly extending tension means; and e. said tension means being in yieldable engagement with said extension-engaging means when said tread-engaging elements are held by said tension means in said operative tread-engaging position.

2. In a traction device as defined in Claim 1:

f. said tread-engaging elements being in an annular row and in opposed pairs at diametrically opposite points around said tread and the outer extension on the tread-engaging elements of each opposed pair of the latter extending radially of said row and toward each other and g. said tension means connecting the outer extensions on each opposed pair of tread-engaging elements.

3. In a traction device as defined in Claim 2:

h. said tension-engaging means comprising a circular, disc-like plate; and i. means on said plate in cooperative relation with said outer extensions and said tensioning means for holding said plate substantially coaxial with the axis of said axle and against rotation about the latter when said elements are in said tread-engaging position and said tension means is tensioned.

4. In a traction device as defined in Claim 1:

f. said elements being in pairs respectively positioned at diametrically opposite points around said tire when in said operative tread-engaging position; and g. said tension means comprising elongated elastic strips extending across the axis of said axle and across said extension engaging means in crossing relation intermediate their ends.

5. An anti-skid traction device for application to and removal from a wheel that includes a pneumatic tire having a ground-engaging tread, and which wheel is mounted on an axle of a vehicle and has an outer side facing outwardly of said wheel, comprising:

a. ground-engaging anti-skid means including tread-engaging elements adapted to be supported substantially horizontally in an operative tread-engaging position extending transversely across said tread, and outer and inner extensions on said tread-engaging elements respectively extending radially inwardly from said tread-engaging elements relative to said axis at said outer side of said wheel and at the inner side of said wheel when said tread-engaging elements are in said operative tread-engaging position;

b. said tread-engaging elements being in an annular row and in opposed pairs at diametrically opposite points around said tread and the outer extension on the tread-engaging elements of each opposed pair of the latter extending radially of said row and toward each other;

c. an extension engaging plate unsecured to said wheel and said outer extensions disposed between said outer extensions and said wheel;

d. elongated elastic strips respectively connected at their ends to the outer extensions on tread-engaging elements of opposed pairs thereof extending across the central axis of such wheel holding said extensions frictionally against the axially outer surface of said plate for yieldably holding said plate against said wheel when said tread-engaging elements are in operative positions in the tread of said wheel and said strips are tensioned, and means for tensioning said strips;

e. adjacent pairs of spaced projections rigid on said plate between which said strips extend for holding said plate substantially against bodily movement transversely of the axis of said wheel; and f. said plate being free for removal from said wheel, outer extensions and strips upon release of said tensioning means from tension, and means for so releasing said tensioning means.